United States Patent
Kikumoto et al.

(10) Patent No.: US 12,077,103 B2
(45) Date of Patent: Sep. 3, 2024

(54) RIDING MANAGEMENT MACHINE

(71) Applicant: KUBOTA CORPORATION, Osaka (JP)

(72) Inventors: Misako Kikumoto, Sakai (JP); Kunihiko Nishino, Sakai (JP); Yasuaki Morioka, Sakai (JP); Hideaki Ezaki, Sakai (JP); Shunsuke Miyashita, Sakai (JP); Toru Tambo, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 276 days.

(21) Appl. No.: 17/552,482

(22) Filed: Dec. 16, 2021

(65) Prior Publication Data
US 2022/0109224 A1   Apr. 7, 2022

Related U.S. Application Data

(63) Continuation of application No. PCT/JP2020/022094, filed on Jun. 4, 2020.

(30) Foreign Application Priority Data

Sep. 26, 2019 (JP) .................... 2019-175924

(51) Int. Cl.
| | |
|---|---|
| *B60R 11/02* | (2006.01) |
| *G01S 19/42* | (2010.01) |
| *H01Q 1/32* | (2006.01) |
| *B60R 11/00* | (2006.01) |
| *G01S 19/14* | (2010.01) |

(Continued)

(52) U.S. Cl.
CPC .............. *B60R 11/02* (2013.01); *G01S 19/42* (2013.01); *H01Q 1/3233* (2013.01); *B60R 2011/004* (2013.01); *G01S 19/14* (2013.01); *G01S 19/36* (2013.01); *G01S 19/47* (2013.01)

(58) Field of Classification Search
CPC ........ B06R 11/02; G01S 19/42; G01S 19/47; G01S 19/14; G01S 19/36
See application file for complete search history.

(56) References Cited

FOREIGN PATENT DOCUMENTS

| CN | 103125463 A | 6/2013 |
|---|---|---|
| DE | 102017214354 B3 * | 9/2018 |
| JP | 05-79053 A | 3/1993 |

(Continued)

OTHER PUBLICATIONS

Official Communication issued in corresponding Indian Patent Application No. 202117058329, mailed on Jun. 24, 2022.

(Continued)

*Primary Examiner* — Joseph J Lauture
(74) *Attorney, Agent, or Firm* — Keating & Bennett, LLP

(57) ABSTRACT

A riding management machine includes a traveling vehicle including a vehicle body, an operator's seat provided on the vehicle body, and a hood provided in front of the operator's seat, a working device attached to the traveling vehicle, a position detector to detect a position of the vehicle body based on a signal from a positioning satellite, and a support body to support the position detector above the hood. The support body includes a pair of struts on opposite sides of the vehicle body in a vehicle-width direction, a connector to connect tops of the pair of struts to each other, and reinforcements to connect the respective struts to the vehicle body.

12 Claims, 13 Drawing Sheets

(51) Int. Cl.
G01S 19/36 (2010.01)
G01S 19/47 (2010.01)

(56) References Cited

FOREIGN PATENT DOCUMENTS

| | | |
|---|---|---|
| JP | 2003-125606 A | 5/2003 |
| JP | 2003-326984 A | 11/2003 |
| JP | 2007-146512 A | 6/2007 |
| JP | 2017-165250 A | 9/2017 |
| JP | 2019-054815 A | 4/2019 |
| WO | 2016/200770 A1 | 12/2016 |

OTHER PUBLICATIONS

Official Communication issued in International Patent Application No. PCT/JP2020/022094, mailed on Aug. 25, 2020.
Official Communication issued in European Patent Application No. 20867798.9, mailed on Sep. 9, 2023.

* cited by examiner

RIDING MANAGEMENT MACHINE

CROSS REFERENCE TO RELATED APPLICATIONS

This application is a continuation application of International Application No. PCT/JP2020/022094, filed on Jun. 4, 2020, which claims the benefit of priority to Japanese Patent Application No. 2019-175924, filed on Sep. 26, 2019. The entire contents of each of these applications are hereby incorporated herein by reference.

BACKGROUND OF THE INVENTION

1. Field of the Invention

The present invention relates to a riding management machine including a traveling vehicle and a working device.

2. Description of the Related Art

A riding management machine disclosed in Japanese Unexamined Patent Publication No. 2003-125606 is known.

The riding management machine disclosed in Japanese Unexamined Patent Publication No. 2003-125606 includes a traveling vehicle (traveling unit) and a working device (tilling unit) attached to a rear portion of the traveling vehicle.

SUMMARY OF THE INVENTION

The riding management machine disclosed in Japanese Unexamined Patent Publication No. 2003-125606 cannot determine the current position of a vehicle body accurately. Thus, it is difficult to precisely and efficiently perform agricultural work. In view of this, a position detector that detects the position of the vehicle body based on a signal from a positioning satellite may be attached to the riding management machine. However, the above-mentioned riding management machine does not include a structure capable of reliably supporting the position detector on the vehicle body.

Preferred embodiments of the present invention provide riding management machines having a structure that is capable of reliably supporting a position detector on a vehicle body.

A riding management machine according to an aspect of a preferred embodiment of the present invention includes a traveling vehicle including a vehicle body, an operator's seat provided on the vehicle body, and a hood provided in front of the operator's seat, a working device attached to the traveling vehicle, a position detector to detect a position of the vehicle body based on a signal from a positioning satellite, and a support body to support the position detector above the hood. The support body includes a pair of struts on opposite sides of the vehicle body in a vehicle-width direction, a connector to connect tops of the pair of struts to each other, and reinforcements to connect the respective struts to the vehicle body.

Preferably, the reinforcements include main reinforcements extending forward or rearward from vertically intermediate portions of the respective struts to the vehicle body, and sub reinforcements extending in the vehicle-width direction from vertically intermediate portions of the respective struts to the vehicle body.

Preferably, the main reinforcements and the sub reinforcements are joined to the respective struts so that positions where the main reinforcements are joined to the struts are offset upward or downward from positions where the sub reinforcements are joined to the struts.

Preferably, the positions where the main reinforcements are joined to the struts are above the positions where the sub reinforcements are joined to the struts.

Preferably, the struts include a first strut on a first side in the vehicle-width direction of the vehicle body, and a second strut provided on a second side in the vehicle-width direction of the vehicle body, and the reinforcements include a first reinforcement to connect a vertically intermediate portion of the first strut to the vehicle body, and a second reinforcement to connect a vertically intermediate portion of the second strut to the vehicle body.

Preferably, the riding management machine further includes a traveling device including front wheels and rear wheels to movably support the vehicle body, a front axle frame to support a front axle joined to the front wheels, and brackets each of which is attached to the front axle frame to have a lower portion of each of the struts fixed thereto.

Preferably, each of the sub reinforcements is fixed at a lower end thereof to each of the brackets.

Preferably, each of the struts includes, at a lower end thereof, a traversal portion extending inward in the vehicle-width direction and fixed to each of the brackets.

Preferably, each of the sub reinforcements is fixed at a lower end thereof to each of the traversal portions.

Preferably, the riding management machine further includes steps forward and sideward of the operator's seat. Each of the main reinforcements is joined at one end thereof to each of the struts and is joined at the other end thereof to each of the steps.

Preferably, the support body includes a lower section attached to the vehicle body, and an upper section detachably attached to the lower section. The lower section includes a lower portion of the first strut and a lower portion of the second strut. The upper section includes the connector, an upper portion of the first strut, and an upper portion of the second strut.

Preferably, the reinforcements connect the lower section to the vehicle body.

Preferably, the first strut, the second strut and the connection portion each include a round pipe.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 6 is a plan view illustrating a front axle frame, a support body, and the like.

FIG. 11 is a perspective view illustrating a first bracket, a first connection member, and the like.

FIG. 12 is a perspective view illustrating a first reinforcement, the first joint member, the first connection member, and the like.

FIG. 13 is a side view illustrating the first reinforcement, the first joint member, the first connection member, and the like.

DETAILED DESCRIPTION OF THE PREFERRED EMBODIMENTS

Figure 1:
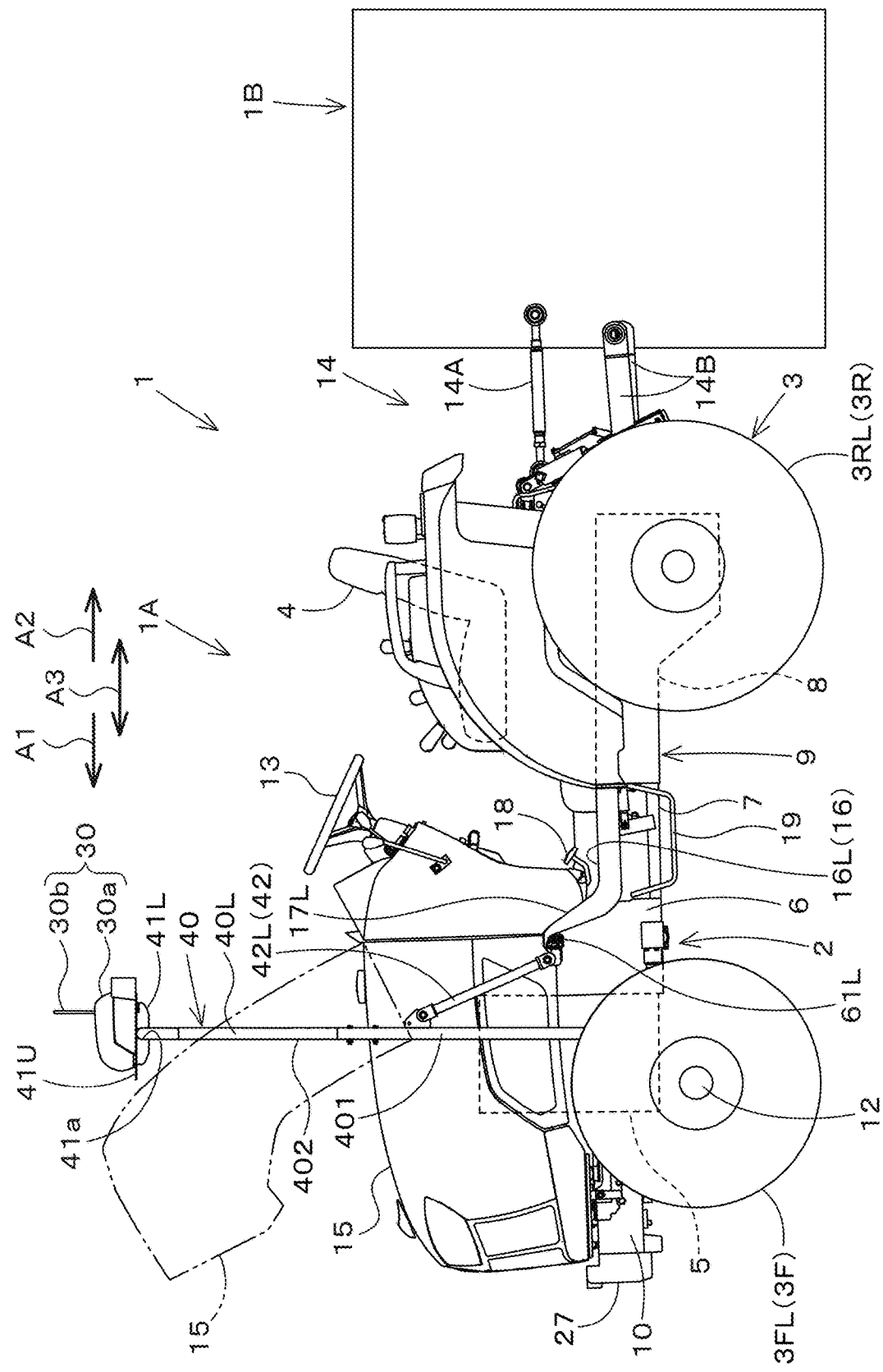
FIG. 1 is a side view of a riding management machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinbelow, preferred embodiments of riding management machines according to the present invention will be described.

FIG. 1 is a side view illustrating a preferred embodiment of the riding management machine 1.

As illustrated in FIG. 1, the riding management machine 1 includes a traveling vehicle 1A and a working device 1B attached to the traveling vehicle 1A. In the riding management machine 1, an operator can ride on the traveling vehicle 1A and perform work (agricultural work) on an agricultural field using the working device 1B.

As illustrated in FIGS. 1 to 4, the traveling vehicle 1A includes a vehicle body 2 and a traveling device 3 movably supporting the vehicle body 2.

In the present preferred embodiment, a forward direction (a direction indicated by arrow A1 in FIG. 1) of the operator (driver) sitting on an operator's seat 4 provided on the vehicle body 2 is referred to as "front" or "forward", a rearward direction (a direction indicated by arrow A2 in FIG. 1) of the operator is referred to as "rear" or "rearward", a leftward direction (a direction indicated by arrow B2 in FIG. 2) of the operator is referred to as "left" or "leftward", and a rightward direction (a direction indicated by arrow B1 in FIG. 2) of the operator is referred to as "right" or "rightward". A horizontal direction, which is orthogonal to a fore-and-aft direction (a direction indicated by arrow A3 in FIG. 1), is referred to as a vehicle-width direction (refer to a direction indicated by arrow B3 in FIG. 2). A direction separating from the vehicle body 2 that is the vehicle-width direction B3 is referred to as "outward" in the vehicle-width direction, and a direction approaching the vehicle body 2 that is the vehicle-width direction is referred to as "inward" in the vehicle-width direction.

As illustrated in FIG. 1, the vehicle body 2 includes a prime mover 5, a clutch housing 6, a coupling frame 7, and a transmission case 8.

The prime mover 5 is, for example, an engine and, specifically, a diesel engine. The clutch housing 6 is coupled to a rear portion of the prime mover 5. A flywheel that reduces fluctuations in the torque of the prime mover 5 to stabilize the torque and a clutch that intermittently transmits power of the prime mover 5 transmitted thereto through the flywheel are housed in the clutch housing 6. The coupling frame 7 couples the clutch housing 6 and the transmission case 8 to each other. A transmission that speed-shifts power transmitted through the clutch is housed in the transmission case 8. The prime mover 5, the clutch housing 6, the coupling frame 7, and the transmission case 8 are integrally coupled to each other to define a vehicle body frame 9.

Figure 2:
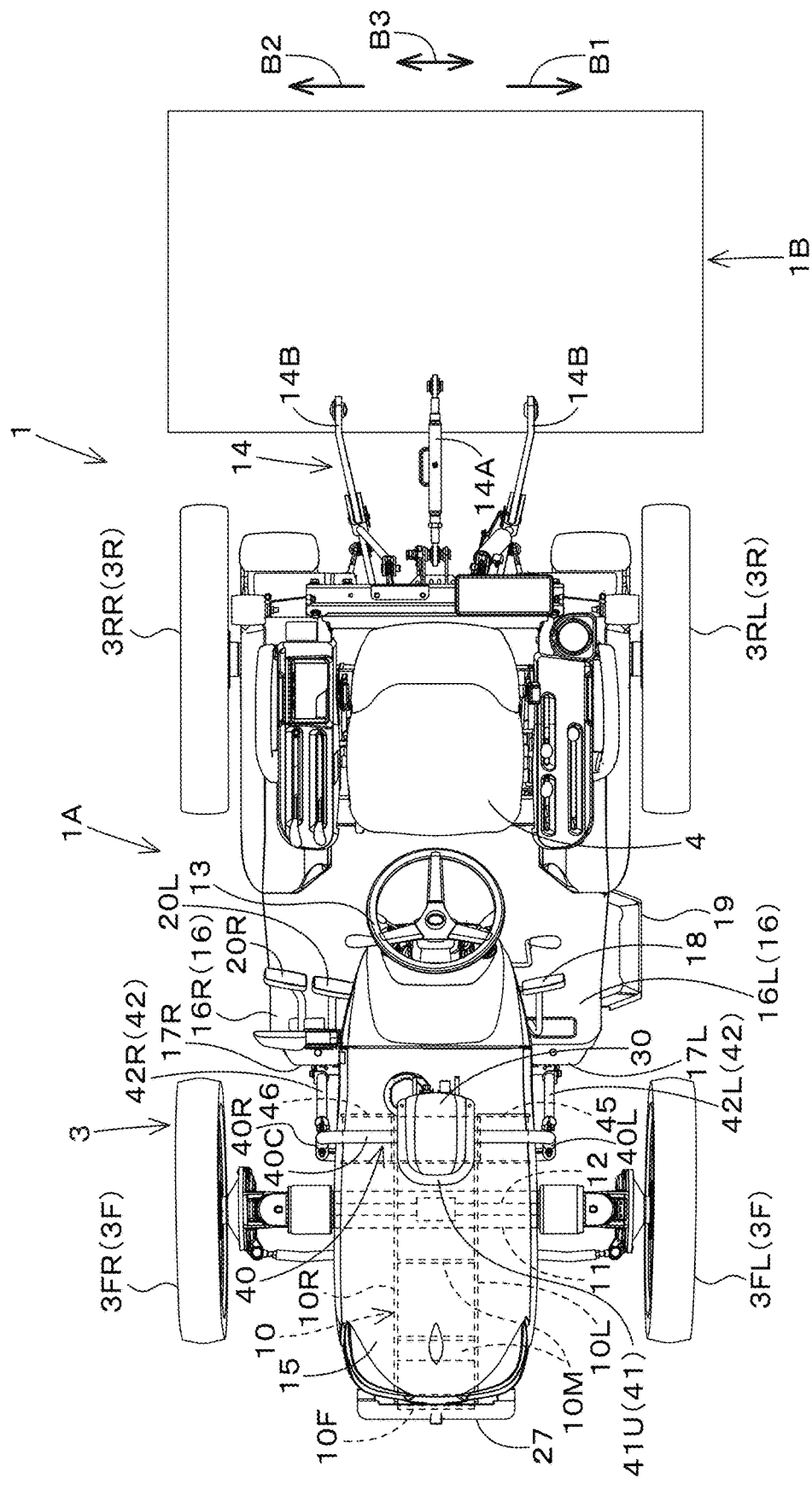
FIG. 2 is a plan view of the riding management machine.

The traveling device 3 includes front wheels 3F and rear wheels 3R. As illustrated in FIG. 2, the front wheels 3F include a left front wheel 3FL disposed on the left side of the vehicle body 2 and a right front wheel 3FR disposed on the right side of the vehicle body 2. The rear wheels 3R include a left rear wheel 3RL disposed on the left side of the vehicle body 2 and a right rear wheel 3RR disposed on the right side of the vehicle body 2.

As illustrated in FIGS. 1 and 2, the vehicle body 2 includes a front axle frame 10 fixed to a lower portion of the prime mover 5. The front axle frame 10 supports a front axle case 11. A front axle 12 connected to the front wheels 3F is housed in the front axle case 11.

Figure 6:
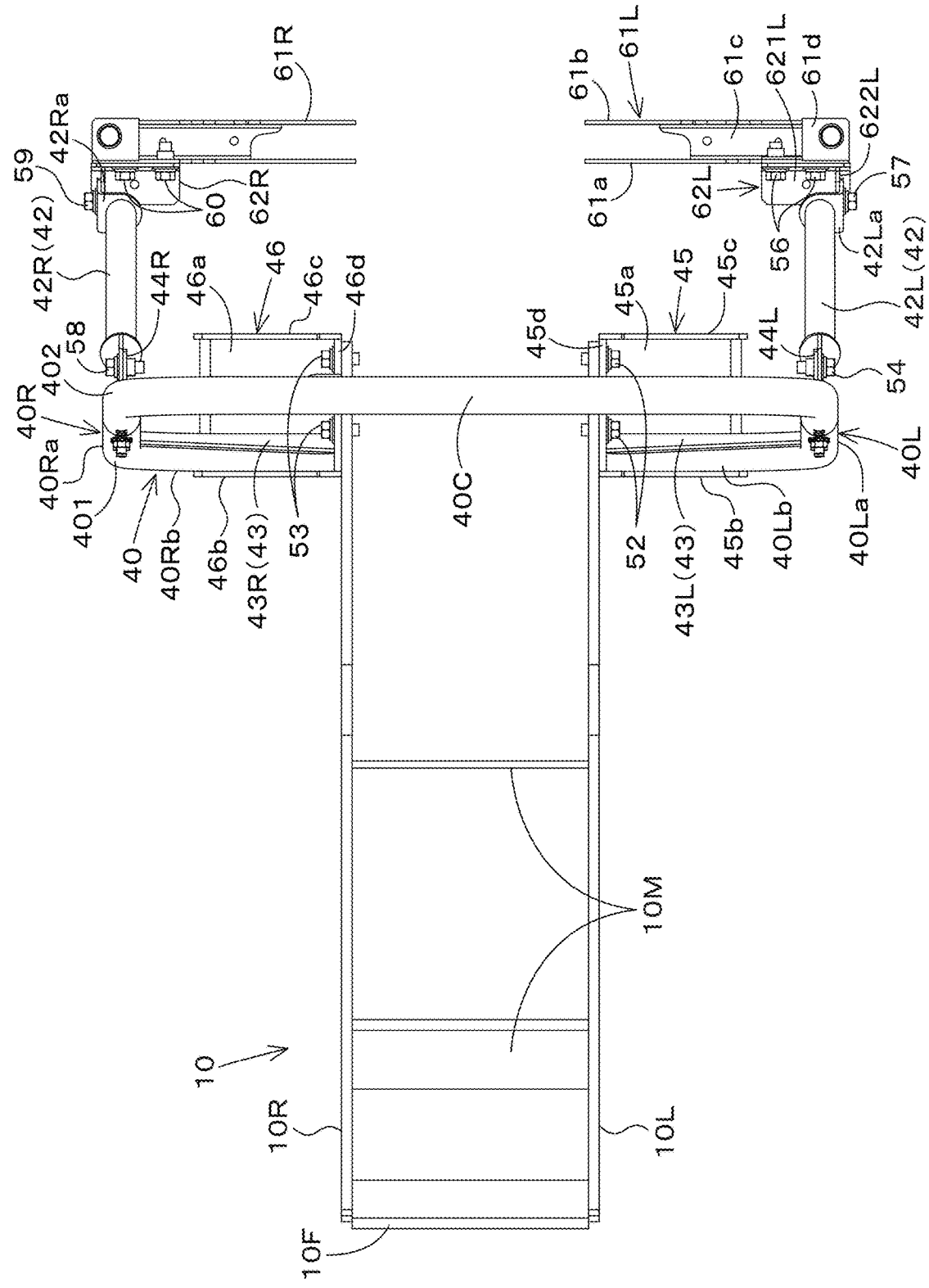

As illustrated in FIGS. 2 and 6, the front axle frame 10 includes a left frame 10L, a right frame 10R, a front frame 10F, and an intermediate frame 10M. The left frame 10L is fixed to a lower left portion of the prime mover 5. The right frame 10R is fixed to a lower right portion of the prime mover 5. The left frame 10L and the right frame 10R extend parallel to each other in the fore-and-aft direction. The front frame 10F connects a front end of the left frame 10L and a front end of the right frame 10R to each other. The intermediate frame 10M connects a fore-and-aft intermediate portion of the left frame 10L and a fore-and-aft intermediate portion of the right frame 10R to each other. A weight 27 is attached to a front portion of the front frame 10F.

The operator' seat 4 is provided on a rear portion of the vehicle body 2. The operator's seat 4 is provided between the left rear wheel 3RL and the right rear wheel 3RR. A steering wheel 13 operable to steer steerable wheels (the front wheels 3F in the present preferred embodiment) is provided in front of the operator's seat 4. An attaching device 14 is provided on the rear portion of the vehicle body 2. The working device 1B is detachably attached to the attaching device 14. The attaching device 14 includes a three-point linkage mechanism including one top linkage 14A and two lower linkages 14B. The attaching device 14 is capable of raising and lowering the working device 1B relative to the vehicle body 2. For example, a vegetable (e.g., onion) transplanter that serves as the working device 1B can be attached to the attaching device 14. Note that the working device 1B is not limited to the transplanter and may be any device that performs work on an agricultural field. Further, the working device 1B may be attached to a front portion of the vehicle body 2.

A hood 15 is provided in front of the operator's seat 4. The hood 15 is attached to the vehicle body frame 9 so as to cover the prime mover 5. The hood 15 is openable upward. Specifically, when the hood 15 is opened, a front portion of the hood 15 is raised with a rear portion thereof serving as a fulcrum (refer to a virtual line in FIG. 1).

As illustrated in FIG. 2, steps 16 are provided sideward and forward (obliquely forward) of the operator's seat 4. The steps 16 include a first step 16L and a second step 16R. The first step 16L is provided on one side in the vehicle-width direction (leftward) of the operator's seat 4. The second step 16R is provided on the other side in the vehicle-width direction (rightward) of the operator's seat 4.

Figure 4:
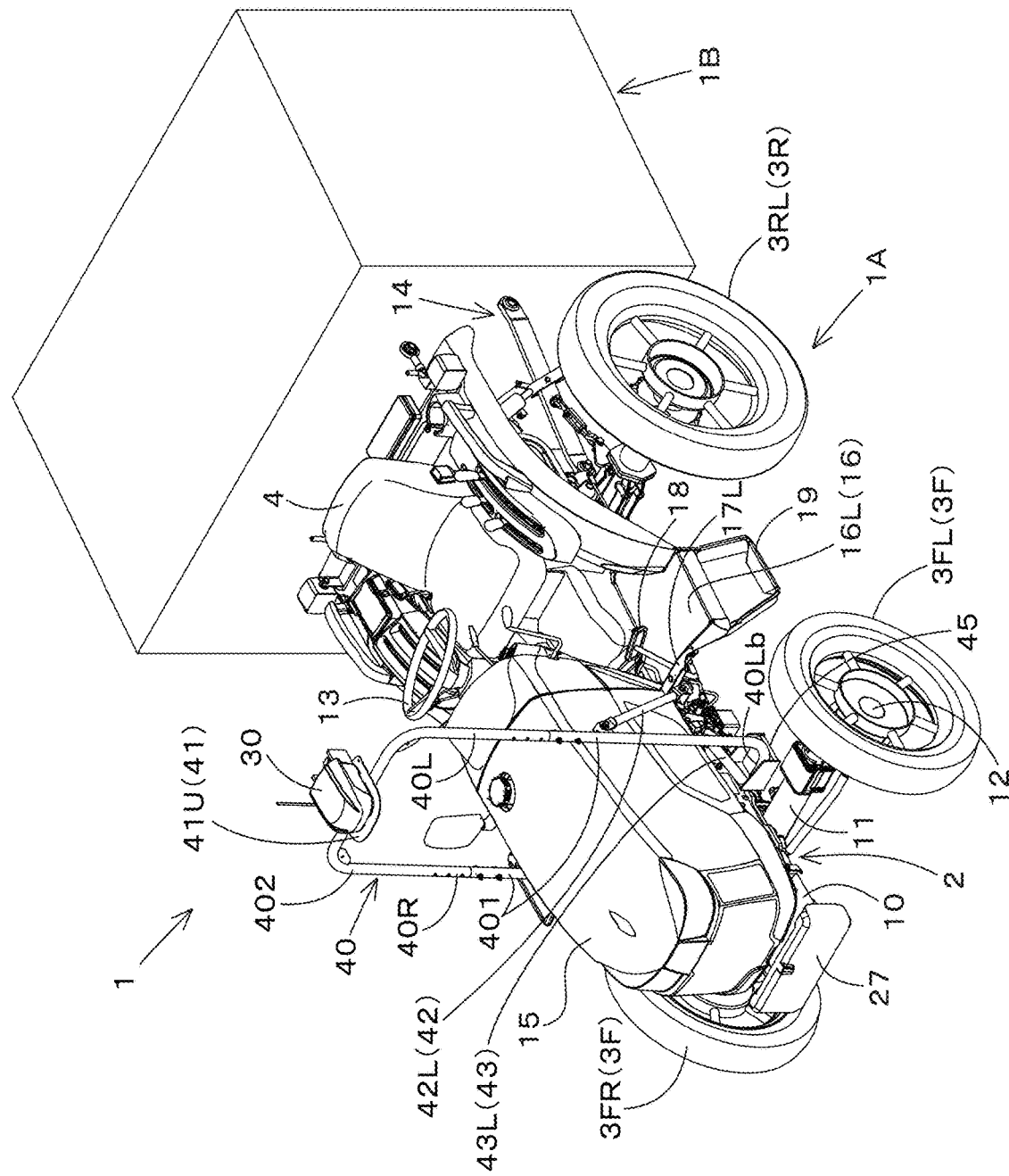
FIG. 4 is a perspective view of the riding management machine.

A first rising portion 17L is provided on a front portion of the first step 16L. The first rising portion 17L is located leftward and forward of the operator's seat 4 and rises forwardly upward slantwise as illustrated in FIGS. 1 and 4.

A pedal shaft of a clutch pedal 18 penetrates the first rising portion 17L. A foothold portion 19 for an operator (driver) to put his/her foot thereon when the operator gets on or off the traveling vehicle 1A is provided on a left portion of the first step 16L.

A second rising portion 17R is provided on a front portion of the second step 16R. The second rising portion 17R is located rightward and forward of the operator's seat 4 and rises forwardly upward slantwise. Pedal shafts of brake pedals 20L and 20R penetrate the second rising portion 17R.

Figure 5:
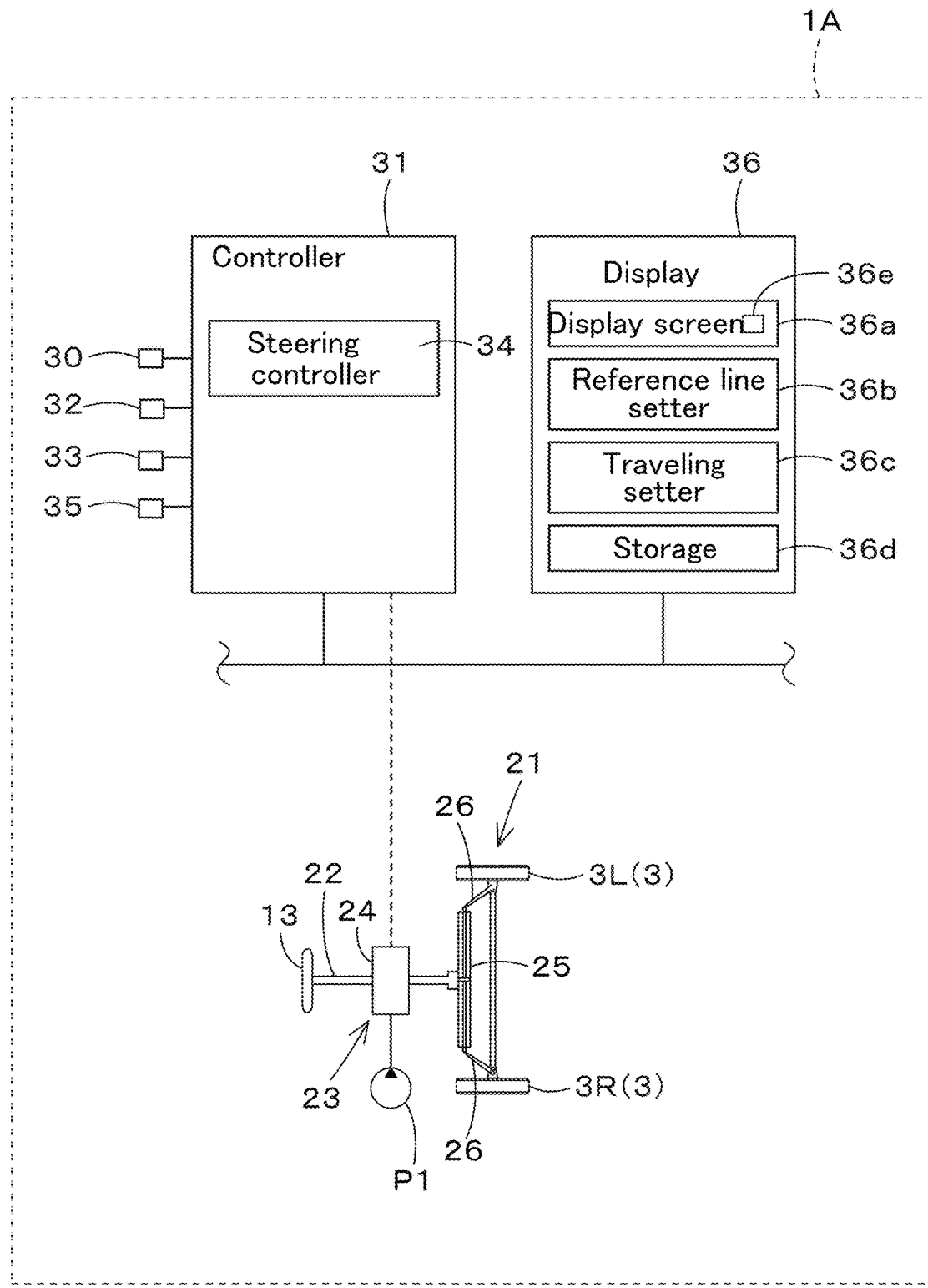
FIG. 5 is a diagram illustrating a configuration of a traveling vehicle including a control block diagram.

As illustrated in FIG. 5, the traveling vehicle 1A includes a steering device 21. The steering device 21 includes the steering wheel 13, a steering shaft 22 rotatable along with rotation of the steering wheel 13, and an assist mechanism (power steering mechanism) 23 that assists steering of the steering wheel 13. The assist mechanism 23 incudes a hydraulic pump P1, a control valve 24 supplied with a hydraulic fluid delivered from the hydraulic pump P1, and a steering cylinder 25 configured to be operated by the control valve 24. The control valve 24 is a solenoid valve operated in accordance with a control signal. For example, the control vale 24 is a 3-position switching valve configured to be switched by, for example, movement of a spool. The control valve 24 is also configured to be switched by steering of the steering shaft 22. The steering cylinder 25 is connected to arms (knuckle arms) 26 to change the direction of the front wheels 3FL and 3FR.

When the steering wheel 13 is operated, a switching position and an opening degree of the control valve 24 are changed in response to the operation of the steering wheel 13, and a piston rod of the steering cylinder 25 moves leftward or rightward according to the switching position and the opening degree of the control valve 24. Accordingly, a direction of steering the front wheels 3F can be changed. However, the configuration of the steering device 21 is not limited to the above-described configuration.

As illustrated in FIGS. 1 to 4, the traveling vehicle 1A includes a position detector 30 that detects a position (traveling position) of the traveling vehicle 1A (vehicle body 2). The position detector 30 is attached to a support body 40 (described later) and supported on the vehicle body 2.

The position detector 30 receives a signal of a positioning satellite and detects the position of the vehicle body 2 based on the received signal. That is, the position detector 30 detects positional information of the vehicle body 2 using a global navigation satellite system (GNSS). For example, a global positioning system (GPS) is used as the GNSS. For example, a real time kinematic (RTK) positioning method is used as a positioning method using a positioning satellite system.

The position detector 30 detects its own position (positioning information including its latitude and longitude) using the satellite positioning system. That is, the position detector 30 receives a signal (e.g., a position of the positioning satellite, a transmission time, or correction information) transmitted from the positioning satellite and detects the position (latitude and longitude) based on the received signal. Preferably, the position detector 30 detects, as its own position (latitude and longitude), a position corrected based on, for example, a correction signal from a base station (reference station) configured to receive a signal from the positioning satellite. Alternatively, the position detector 30 may include an inertial measurement device such as a gyroscopic sensor or an acceleration sensor and detect a position corrected by the inertial measurement device as its own position.

As illustrated in FIG. 5, the traveling vehicle 1A includes a controller 31.

The position detector 30, a traveling detector 32 of a traveling system, and a work detector 33 of a work system are connected to the controller 31. Thus, the controller 31 is configured or programmed to acquire the position detected by the position detector 30, a detection value detected by the traveling detector 32, and a detection value detected by the work detector 33. Examples of the traveling detector 32 include a crank sensor, a cam sensor, an engine rotation sensor, an accelerator sensor, a vehicle speed sensor, and a steering angle sensor. Examples of the work detector 33 include a lever detection sensor and a PTO rotation sensor.

The controller 31 controls the traveling system and the work system in the traveling vehicle 1A. The controller 31 controls, for example, a rotation speed of the prime mover 5 (engine), the vehicle speed, or the steering angle of the steering device 21 based on the detection value detected by the traveling detector 32. Further, the controller 31 controls, for example, raising and lowering of a lifting device that raises and lowers the working device attached to the traveling vehicle 1A or a PTO rotation speed based on the detection value detected by the work detector 33.

The controller 31 includes a steering controller 34. The steering controller 34 is, for example, an electric or electronic component provided in the controller 31, or a program stored in the controller 31.

The steering controller 34 (controller 31) automatically controls steering of the traveling vehicle 1A (automatic steering control) based on a predetermined planned traveling route (planned traveling path). As illustrated in FIG. 5, the traveling vehicle 1A includes, for example, a switch (command switch) 35 that enables or disables the automatic steering control. The command switch 35 is connected to the controller 31. The command switch 35 is switchable between ON and OFF. The command switch 35 enables the automatic steering control when the command switch 35 is ON and disables the automatic steering control when the command switch 35 is OFF. The command switch 35 is installed near the operator's seat 4 and operable by an operator (driver).

When the automatic steering control is enabled, the steering controller 34 sets the switching position and the opening degree of the control valve 24 so that at least the traveling position (the position detected by the position detector 30) of the traveling vehicle 1A (traveling body 2) coincides with the planned traveling route. In other words, when the automatic steering control is enabled, the controller 31 determines a moving direction and a moving amount of the piston rod of the steering cylinder 25 (the steered direction and angle of the front wheels 3F) so that the traveling position of the traveling vehicle 1A coincides with the planned traveling route.

Specifically, when the automatic steering control is enabled, the steering controller 34 compares the traveling position of the traveling vehicle 1A (vehicle body 2) detected by the position detector 30 with a position indicated by the planned traveling route (planned traveling position). When the traveling position coincides with the planned traveling position, the steering controller 34 holds the steering angle and the steering direction of the steering wheel 13 of the steering device 21 (the steered angle and direction of the front wheels 3F) unchanged (maintains the opening degree and the switching position of the control valve 24 unchanged). When the traveling position does not coincide with the planned traveling position, the steering controller 34 changes the rotation angle and/or the rotation direction of the steering wheel 13 of the steering device 21 (changes the opening degree and/or the switching position of the control valve 24) so as to eliminate a deviation (deviation amount) of the traveling position from the planned traveling position.

When the automatic steering control is disabled, the steering controller 34 sets, for example, the steered direction and angle of the front wheels 3F, or the vehicle speed in accordance with an operation of an operator (e.g., an operation of an operator on the steering wheel 13 or an operation of an operator on an accelerator). That is, an operator can manually change the direction of the traveling vehicle 1A (vehicle body 2) through the steering controller 34.

As illustrated in FIG. 5, the traveling vehicle 1A includes a display 36. The display 36 is disposed, for example, near the operator's seat 4. An operator sitting on the operator's seat 4 can visually recognize and operate the display 36. The display 36 is configured to display various pieces of information and includes a display screen 36a that may be, for example, a liquid crystal panel or a touch panel.

The display 36 includes a reference line setter 36b and a traveling setter 36c. The reference line setter 36b and the traveling setter 36c are each, for example, an electric or electronic component provided in the display 36, or a program stored in the display 36 or the like. The reference line setter 36b sets a reference line to be referred to during traveling. The traveling setter 36c performs setting related to traveling of the traveling vehicle 1A. The traveling setter 36c sets the planned traveling route for the traveling vehicle 1A (vehicle body 2) based on the reference line set by manual traveling. The display screen 36a of the display 36 is configured to display the planned traveling route.

The display 36 includes a storage 36d. The storage 36d is, for example, a nonvolatile memory. A start position and an end position of the reference line are stored in the storage 36d when the reference line is determined by straight traveling of the traveling vehicle 1A. Specifically, when the traveling vehicle 1A is located at a work start position and a path setting button 36e (refer to FIG. 5) displayed on the display 32 is pressed, a start point is stored (registered) in the storage 36d as positional information acquired by the satellite positioning system. Next, by the manual operation, the traveling vehicle 1A is caused to travel straight and the working device performs work, and the path setting button 36e is pressed when the traveling vehicle 1A comes to a work end position at an end of an agricultural field. Accordingly, an end point is stored (registered) as positional information in the storage 36d, and a reference line that is a straight line connecting the start point to the end point is stored (registered) in the storage 36d. The planned traveling route is parallel to the reference line. Any number of planned traveling routes may be set according to, for example, the area of the agricultural field.

The traveling vehicle 1A described above is caused to travel along the planned traveling route by automatically steering the vehicle body 2 based on the planned traveling route through the automatic steering control performed by the steering controller 28.

Hereinbelow, the support body 40 supporting the position detector 30 will be described.

Figure 3:
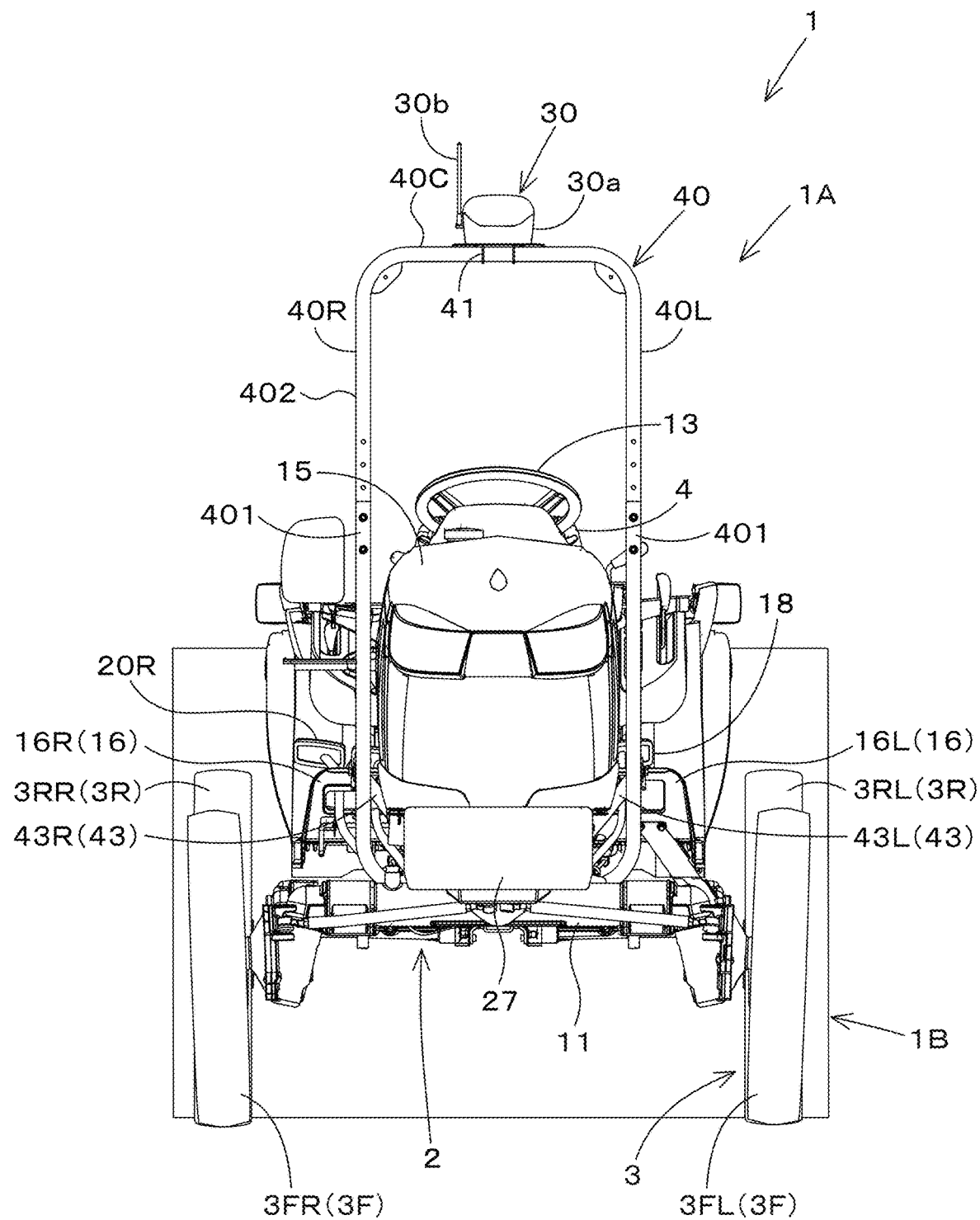
FIG. 3 is a front view of the riding management machine.

As illustrated in FIGS. 1 to 3, the support body 40 supports the position detector 30 above the hood 15. A signal from the positioning satellite is less likely to be blocked by supporting the position detector 30 above the hood 15. Thus, a receiving sensitivity of the position detector 30 can be improved. The position detector 30 is disposed rearward of the front axle 12 above the hood 15. The position detector 30 is disposed rearward of a fore-and-aft center of the hood 15 (closer to a rear portion of the hood 15). Accordingly, as indicated by the virtual line in FIG. 1, when the hood 15 is opened, interference between the hood 15 and the position detector 30 can be prevented.

Figure 7:
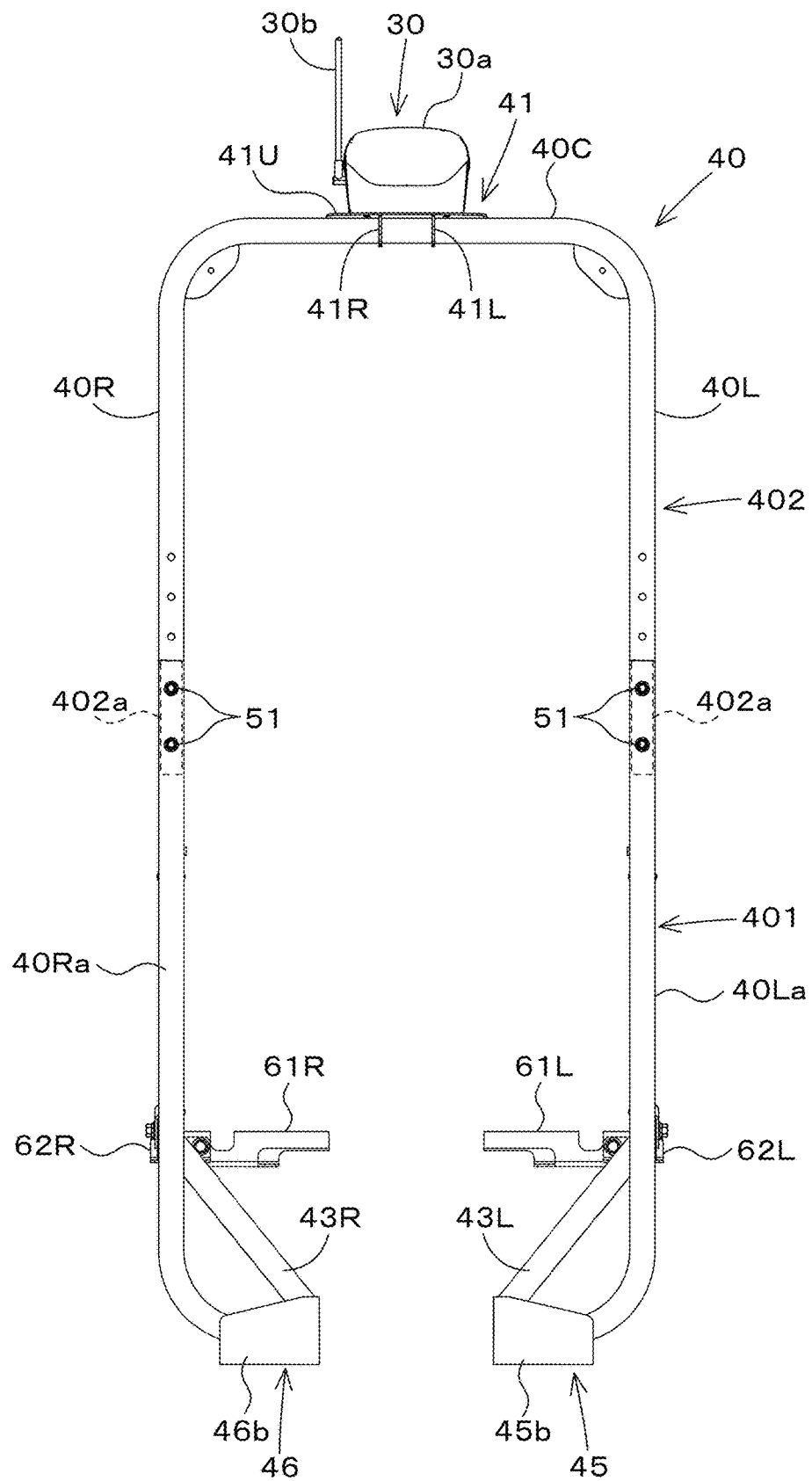
FIG. 7 is a front view of the support body.
Figure 8:
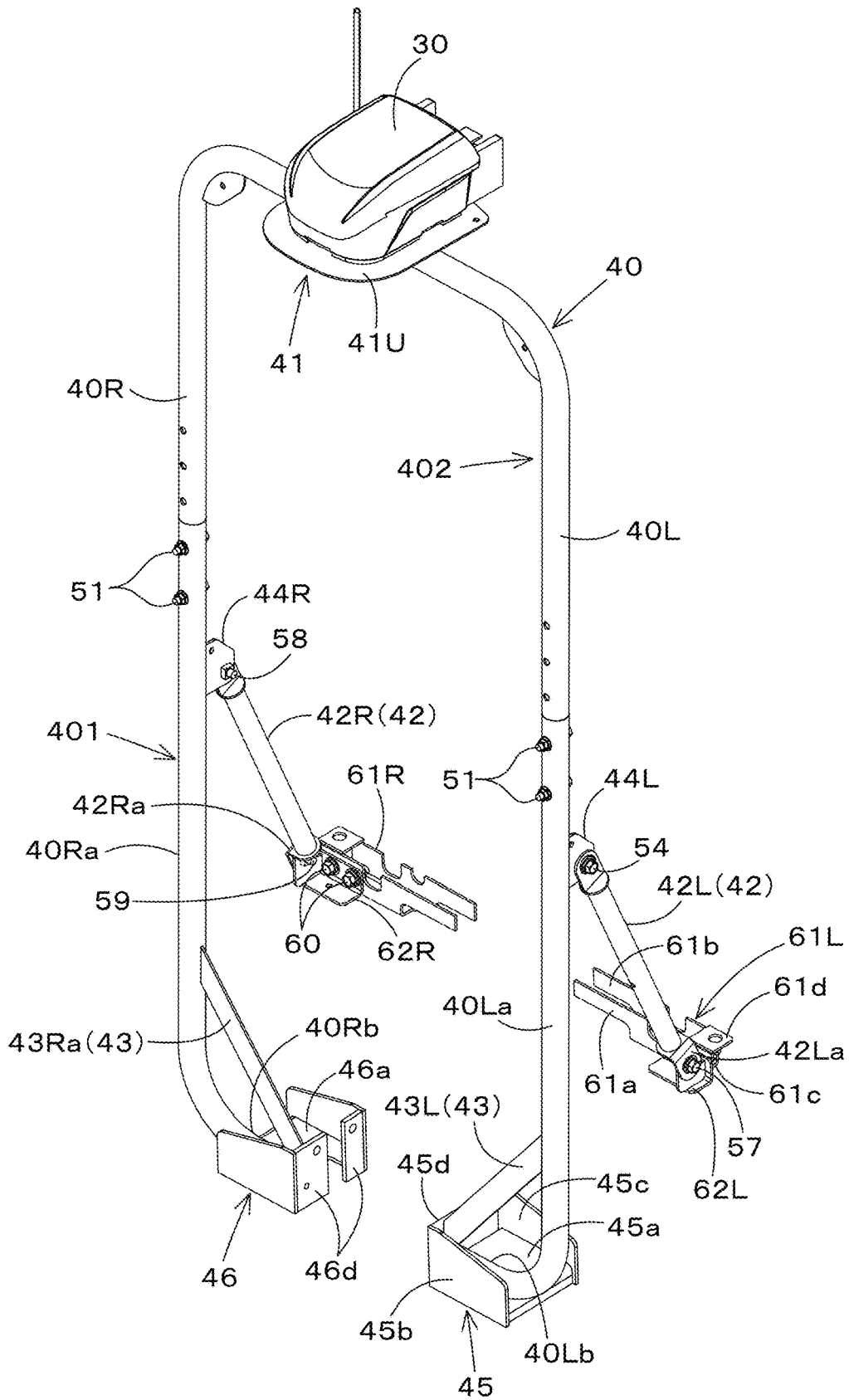
FIG. 8 is a perspective view of the support body.

As illustrated in FIGS. 3, 7, and 8, the support body 40 includes a pair of struts and a connection portion 40C. The pair of struts includes a first strut 40L and a second strut 40R. The first strut 40L, the second strut 40R and the connection portion 40C of the support body 40 are each defined by a hollow pipe (round pipe).

The vehicle body 2 does not include a rollover protection system (ROPS) for protecting an operator sitting on the operator's seat 4 in the event of rollover. The support body 40 does not serve as the ROPS.

The first strut 40L is provided on one side (left side) in the vehicle-width direction of the vehicle body 2. The second strut 40R is provided on the other side (right side) in the vehicle-width direction of the vehicle body 2. The first strut 40L and the second strut 40R are provided forward of the operator's seat 4 and rearward of the front axle 12. Although, in the example illustrated in FIG. 1, the first strut 40L and the second strut 40R extend vertically upward, the first strut 40L and the second strut 40R may be slanted forward or rearward. The connection portion 40C extends in the vehicle-width direction and connects a top of the first strut 40L and a top of the second strut 40R to each other above the hood 15.

The position detector 30 is attached to the connection portion 40C. The position detector 30 is attached to an upper portion of the connection portion 40C. As illustrated in FIG. 2, the position detector 30 and the connection portion 40C overlap each other in plan view.

As illustrated in FIGS. 7 and 8, an attachment portion 41 to attach the position detector 30 thereto is provided on the upper portion of the connection portion 40C. The attachment portion 41 is disposed on the vehicle-width directional center of the connection portion 40C. The attachment portion 41 includes a pair of support plates 41L and 41R, and a placing plate 41U. The position detector 30 is attached to an upper surface of the placing plate 41U with, for example, a bolt. The support plate 41L is fixed to a left portion of a lower surface of the placing plate 41U by, for example, welding. The support plate 41R is fixed to a right portion of the lower surface of the placing plate 41U by, for example, welding. The support plates 41L and 41R are disposed parallel to each other with a space therebetween in the vehicle-width direction. The support plates 41L and 41R are fixed to the upper portion of the connection portion 40C by, for example, welding. Specifically, each of the support plates 41L and 41R has a cutout 41a having a circular arc shape (refer to FIG. 1), and the cutout 41a is welded along an outer peripheral surface of the connection portion 40C.

The position detector 30 includes a device body 30a and an antenna 30b. A height of the connection portion 40C is set so that a height of the position detector 30 (specifically, a height of an upper surface of the device body 30a) is about 2 m or less from the ground, for example.

As illustrated in FIG. 1, the height of the position detector 30 is higher than a height of an upper end of the operator's seat 4 (an upper end of a backrest) and higher than a height of an eye level of an operator sitting on the operator's seat 4. This prevents the position detector 30 from obstructing a forward view of the operator. Further, the height of the position detector 30 is higher than a height of an upper end of the steering wheel 13.

An upper portion and a lower portion of the support body 40 are separate members. Specifically, the support body 40 includes a lower section 410 and an upper section 402. A combination of the lower section 401 and the upper section 402 defines the support body 40.

The lower section 401 includes a lower portion of the first strut 40L and a lower portion of the second strut 40R. The lower section 401 includes pipes defining the lower portion of the first strut 40L and the lower portion of the second strut 40R. The upper section 402 includes the connection portion 40C, an upper portion of the first strut 40L, and an upper portion of the second strut 40R. The upper section 402 includes one pipe bent in a portal shape (inverted U-shape). That is, one pipe defines the upper section 402 including the connection portion 40C, the upper portion of the first strut 40L, and the upper portion of the second strut 40R that define the upper section 402 are defined by one pipe.

The lower section 401 is attached to the vehicle body 2. The upper section 402 is detachably attached to the lower section 401. As illustrated in FIG. 7, the upper section 402 includes, at respective lower portions thereof, small-diameter portions 402a. The smaller-diameter portions 402a have an outer diameter smaller than an inner diameter of the lower section 401. The upper section 402 is detachably attached to the lower section 401 by inserting the small-diameter portions 402a of the upper section 402 into the lower section 401 from respective upper ends of the lower section 401 and fixing them with fasteners (bolts and nuts) 51.

Figure 9:
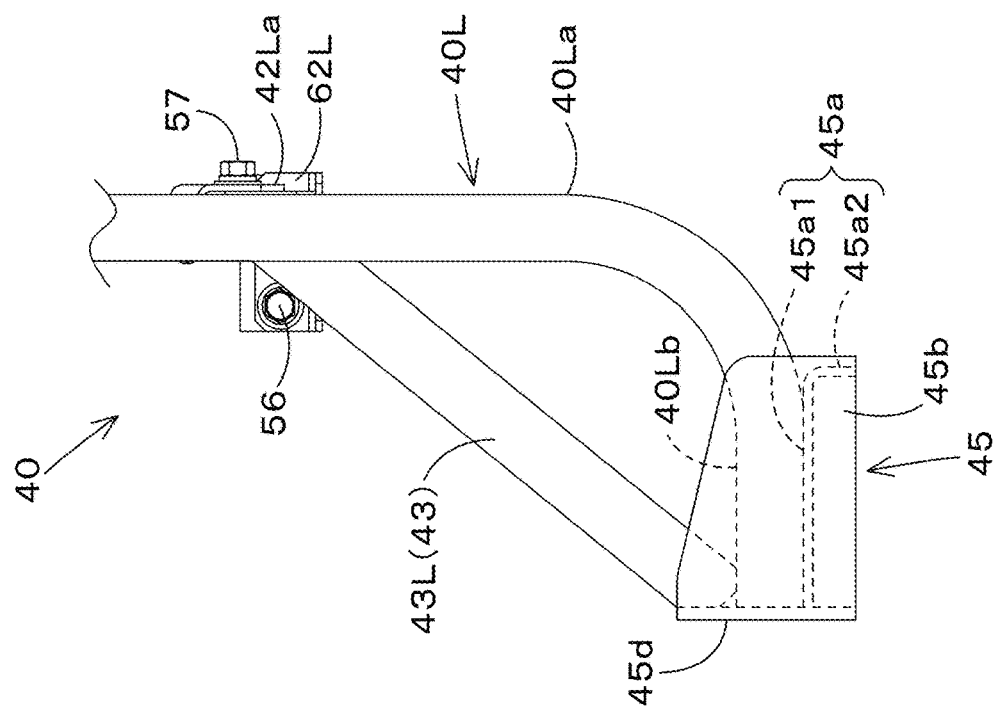
FIG. 9 is a front view of a lower portion of the support body.

As illustrated in FIGS. 6, 8, and 9, the first strut 40L includes a first vertical portion 40La and a first traversal portion 40Lb. The first vertical portion 40La extends in the vertical direction. The first traversal portion 40Lb extends inward in the vehicle-width direction (rightward) from a lower end of the first vertical portion 40La. The first traversal portion Lb is provided on a lower end of the first strut 40L. In other words, the first traversal portion 40Lb extending inward in the vehicle-width direction (rightward) is provided on the lower end of the first strut 40L.

The second strut 40R includes a second vertical portion 40Ra and a second traversal portion 40Rb. The second vertical portion 40Ra extends in the vertical direction. The second traversal portion 40Rb extends inward in the vehicle-width direction (leftward) from a lower end of the second vertical portion 40Ra. The second traversal portion 40Rb is provided on a lower end of the second strut 40R. In other words, the second traversal portion 40Rb extending inward in the vehicle-width direction (leftward) is provided on the lower end of the second strut 40R.

As illustrated in FIGS. 2, 4, 6, and 11, the lower portion (lower section 401) of the support body 40 is attached to the vehicle body 2 (specifically, to the front axle frame 10) through a first bracket 45 and a second bracket 46. The first bracket 45 is attached to one side (left side) in the vehicle-width direction of the vehicle body 2. The second bracket 46 is attached to the other side (right side) in the vehicle-width direction of the vehicle body 2.

The first bracket 45 projects outward in the vehicle-width direction (leftward) from a left portion of the front axle frame 10. The second bracket 46 projects outward in the vehicle-width direction (rightward) from a right portion of the front axle frame 10.

As illustrated in FIG. 2, the first bracket 45 and the second bracket 46 are disposed rearward of the front axle 12. Upper portions of the first bracket 45 and the second bracket 46 are covered by the hood 15. In other words, the first bracket 45 and the second bracket 46 entirely overlap the hood 15 in plan view.

As illustrated in FIGS. 6 to 11, the first bracket 45 includes a first lower plate 45a, a first front plate 45b, a first rear plate 45c, and a first side plate 45d. As illustrated in FIG. 9, the first lower plate 45a includes a first horizontal portion 45a1 and a first vertical portion 45a2. The first horizontal portion 45a1 is disposed with one surface facing up and the other surface facing down. The first vertical portion 45a2 bends from a left end of the first horizontal portion 45a1 and extends downward. The first front plate 45b is connected to a front edge of the first lower plate 45a. The first rear plate 45c is connected to a rear edge of the first lower plate 45a. The first front plate 45b and the first rear plate 45c are disposed parallel to each other with a space therebetween in the fore-and-aft direction. The first side plate 45d is disposed with one surface facing left and the other surface facing right. The one surface of the first side plate 45d is connected to a right end of the first front plate 45b, a right end of the first rear plate 45c, and a right end of the first lower plate 45a.

The second bracket 46 includes a second lower plate 46a, a second front plate 46b, a second rear plate 46c, and a second side plate 46d. As illustrated in FIG. 9, the second lower plate 46a includes a second horizontal portion 46a1 and a second vertical portion 46a2. The second horizontal portion 46a1 is disposed with one surface facing up and the other surface facing down. The second vertical portion 46a2 bends from a right end of the second horizontal portion 46a1 and extends downward. The second front plate 46b is connected to a front edge of the second lower plate 46a. The second rear plate 46c is connected to a rear edge of the second lower plate 46a. The second front plate 46b and the second rear plate 46c are disposed parallel to each other with a space therebetween in the fore-and-aft direction. The second side plate 46d is disposed with one surface facing right and the other surface facing left. The one surface of the second side plate 46d is connected to a left end of the second front plate 46b, a left end of the second rear plate 45c, and a left end of the second lower plate 45a.

As illustrated in FIG. 6, the first side plate 45d of the first bracket 45 is detachably attached to the left frame 10L of the front axle frame 10 with a fastener (a bolt and a nut) 52. The second side plate 46d of the second bracket 46 is detachably attached to the right frame 10R of the front axle frame 10 with a fastener (a bolt and a nut) 53. However, the first bracket 45 and the second bracket 46 may be attached to the vehicle body frame 9 (e.g., a lower portion of a side face of the prime mover 5).

As illustrated in, for example, FIGS. 6, 8, and 9, the first traversal portion 40Lb of the first strut 40L is fixed to the first lower plate 45a of the first bracket 45. The first traversal portion 40Lb extends rightward in contact with the upper surface of the first lower plate 45a of the first bracket 45 (the one surface of the first horizontal portion 45a1) and abuts against, at a right end thereof, the left face (the one surface) of the first side plate 45d. The first traversal portion 40Lb is fixed to the first bracket 45 by, for example, welding. Accordingly, the lower portion of the first strut 40L is fixed to the first bracket 45.

The second traversal portion 40Rb of the second strut 40R is fixed to the second lower plate 46a of the second bracket 46. The second traversal portion 40Rb extends leftward in contact with the upper surface of the second lower plate 46a of the second bracket 46 (the one surface of the second horizontal portion 46a1) and abuts against, at a left end thereof, the right face (the one face) of the second side plate 46d. The second traversal portion 40Rb is fixed to the second bracket 46 by, for example, welding. Accordingly, the lower portion of the second strut 40R is fixed to the second bracket 46.

As illustrated in FIGS. 1 to 4, the support body 40 includes reinforcements 42 and 43 connecting the respective struts (the first strut 40L and the second strut 40R) to the vehicle body 2. The reinforcements 42 and 43 include main reinforcements 42 and sub reinforcements 43.

As illustrated in FIGS. 6, and 8 to 10, the main reinforcements 42 include a first main reinforcement 42L and a second main reinforcement 42R. The first main reinforcement 42L reinforces the first strut 40L. The second main reinforcement 42R reinforces the second strut 40R.

As illustrated in FIGS. 6 to 10, the sub reinforcements 43 include a first sub reinforcement 43L and a second sub reinforcement 43R. The first sub reinforcement 43L reinforces the first strut 40L in a direction different from a reinforcing direction of the first main reinforcement 42L. The second sub reinforcement 43R reinforces the second strut 40R in a direction different from a reinforcing direction of the second main reinforcement 42R.

Hereinbelow, the first main reinforcement 42L and the first sub reinforcement 43L may be collectively referred to as "first reinforcements", and the second main reinforcement 42R and the second sub reinforcement 43R may be collectively referred to as "second reinforcements".

The first reinforcements (the first main reinforcement 42L and the first sub reinforcement 43L) and the second reinforcements (the second main reinforcement 42R and the second sub reinforcement 43R) connect the lower section 401 of the struts 40 to the vehicle body 2.

As illustrated in FIGS. 1, 2, and 4, the main reinforcements 42 extend rearward (specifically, obliquely downward and rearward) from vertically intermediate portions of the respective struts (the first strut 40L and the second strut 40R) to the vehicle body 2. The first main reinforcement 42L connects the vertically intermediate portion of the first strut 40L to the vehicle body 2. The second main reinforcement 42R connects the vertically intermediate portion of the second strut 40R to the vehicle body 2.

As illustrated in, for example, FIGS. 6 and 8, one end (upper end) of the first main reinforcement 42L is joined to the first strut 40L. Specifically, the one end of the first main reinforcement 42L is joined to the first vertical portion 40La of the first strut 40L. The first vertical portion 40La is provided with a projection piece 44L projecting rearward. The one end of the first main reinforcement 42L is joined to the projection piece 44L with a fastener (a bolt and a nut) 54.

Figure 12:
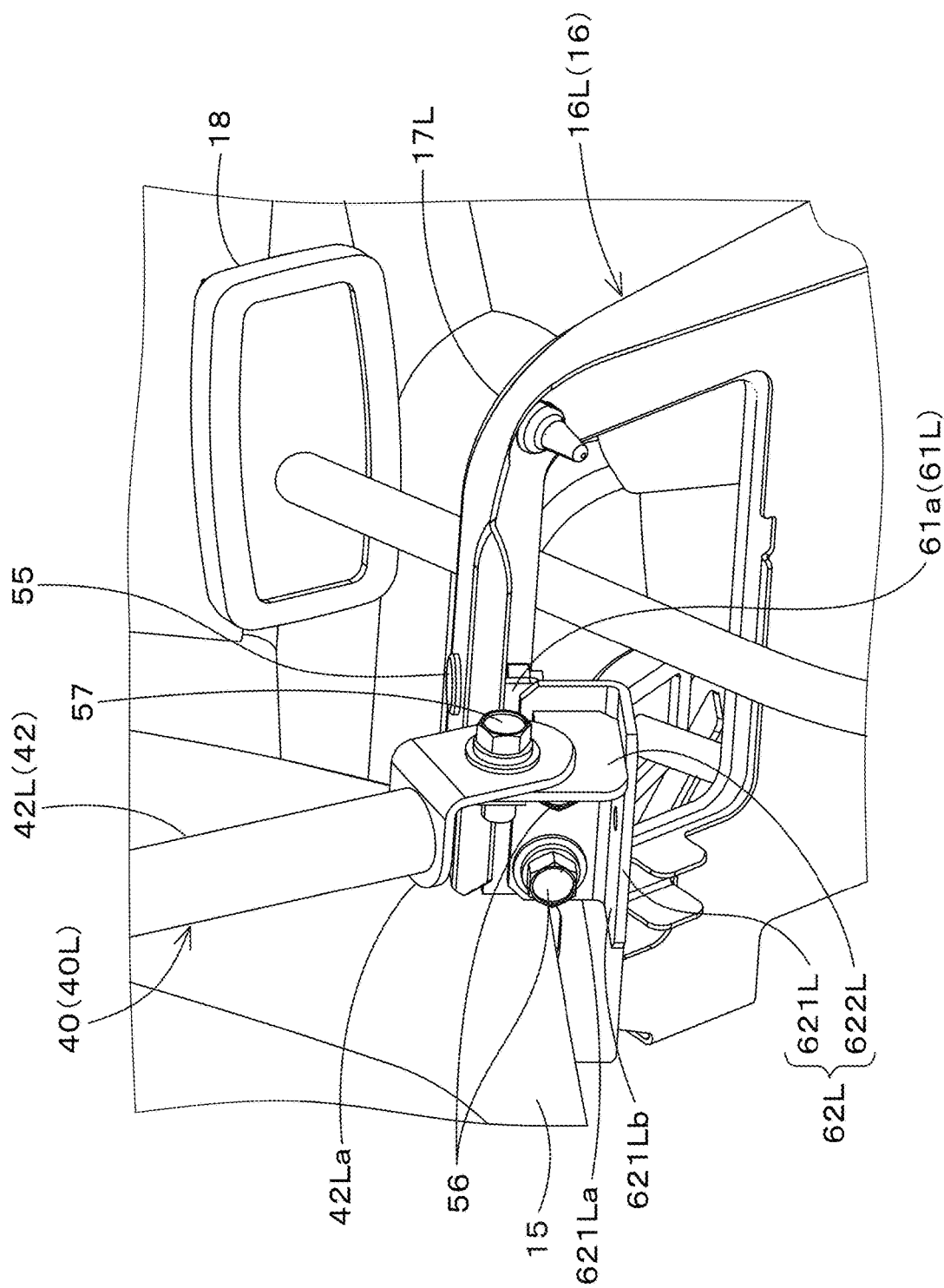
Figure 13:
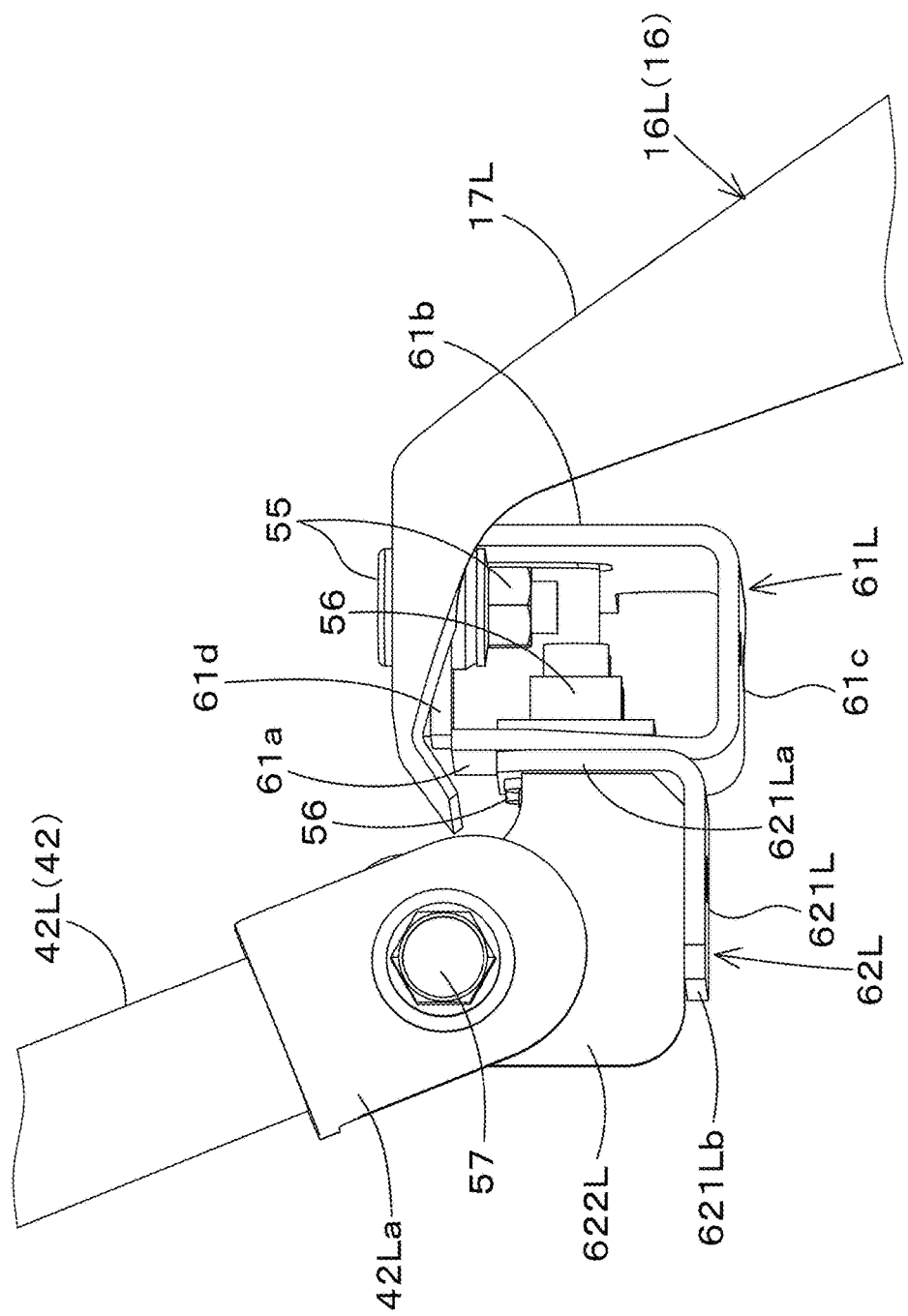

As illustrated in, for example, FIGS. 1, 12, and 13, the other end (lower end) of the first main reinforcement 42L is joined to the first step 16L. Specifically, the other end of the first main reinforcement 42L is joined to the first rising portion 17L of the first step 16L. More specifically, the other end of the first main reinforcement 42L is joined to the first rising portion 17L of the first step 16L through a first joint member 61L.

As illustrated in FIGS. 6 and 13, the first joint member 61L includes a front plate 61a, a rear plate 61b, a lower plate 61c, and an upper plate 61d. The front plate 61a and the rear plate 61b are spaced apart from each other in the fore-and-aft direction and extend parallel to each other in the vehicle-width direction. The lower plate 61c connects a lower end of the front plate 61a and a lower end of the rear plate 61b to each other. The upper plate 61d extends forward from an upper end of the rear plate 61d to the front plate 61a. As illustrated in FIG. 13, the upper plate 61d abuts against a lower surface of an upper portion of the first rising portion 17L and is joined to the lower surface with a fastener (a bolt and a nut) 55.

The other end of the first main reinforcement 42L is joined to the front plate 61a through a first connection member 62L. As illustrated in FIGS. 12 and 13, the first connection member 61L includes a first member 621L and a second member 622L. The first member 621L includes a vertical plate portion 621La and a horizontal plate portion 621Lb. The vertical plate portion 621La has one surface facing front and the other surface facing rear. The other surface of the vertical plate portion 621La abuts against the front plate 61a. The vertical plate portion 621La is joined to the front plate 61a of the first joint member 61L with a fastener (a bolt and a nut) 56. The second member 622L has a plate shape, and has one surface facing left and the other surface facing right. The second member 622L abuts against the vertical plate portion 621La and the horizontal plate portion 621Lb of the first member 621L and is integrated with the first member 621L by, for example, welding.

As illustrated in FIGS. 12 and 13, a connection piece 42La is provided on the other end of the first main reinforcement 42L. The connection piece 42La is joined to the second member 622L of the first connection member 62L with a fastener (a bolt and a nut) 57. Accordingly, the first main reinforcement 42L and the first joint member 61L (front plate 61a) are joined to each other through the first connection member 62L. Further, the first main reinforcement 42L is joined to the first rising portion 17L of the first step 16L through the first joint member 61L.

As illustrated in, for example, FIGS. 6 and 8, one end of the second main reinforcement 42R is joined to the second strut 40R. Specifically, the one end of the second main reinforcement 42R is joined to the second vertical portion 40Ra of the second strut 40R. The second vertical portion 40Ra is provided with a projection piece 44R projecting rearward. The one end of the second sub reinforcement 42R is joined to the projection piece 44R with a fastener (a bolt and a nut) 58.

The other end of the second main reinforcement 42R is joined to the second step 16R. A joining structure between the other end of the second main reinforcement 42R and the second step 16R is similar to a joining structure between the other end of the first main reinforcement 42L and the first step 16L. Thus, only main points will be described, and detailed illustration and description will be omitted.

As illustrated in FIG. 2, the other end of the second main reinforcement 42R is joined to the second rising portion 17R of the second step 16R. Specifically, the other end of the second main reinforcement 42R is joined to the second rising portion 17R of the second step 16R through a second joint member 61R (refer to FIGS. 6 to 8). The configuration of the second joint member 61R is similar to the configuration of the first joint member 61L. Specifically, the shape of the second joint member 61R and the shape of the first joint member 61L are symmetric with respect to the center of the vehicle body 2 in the vehicle-width direction.

Figure 10:
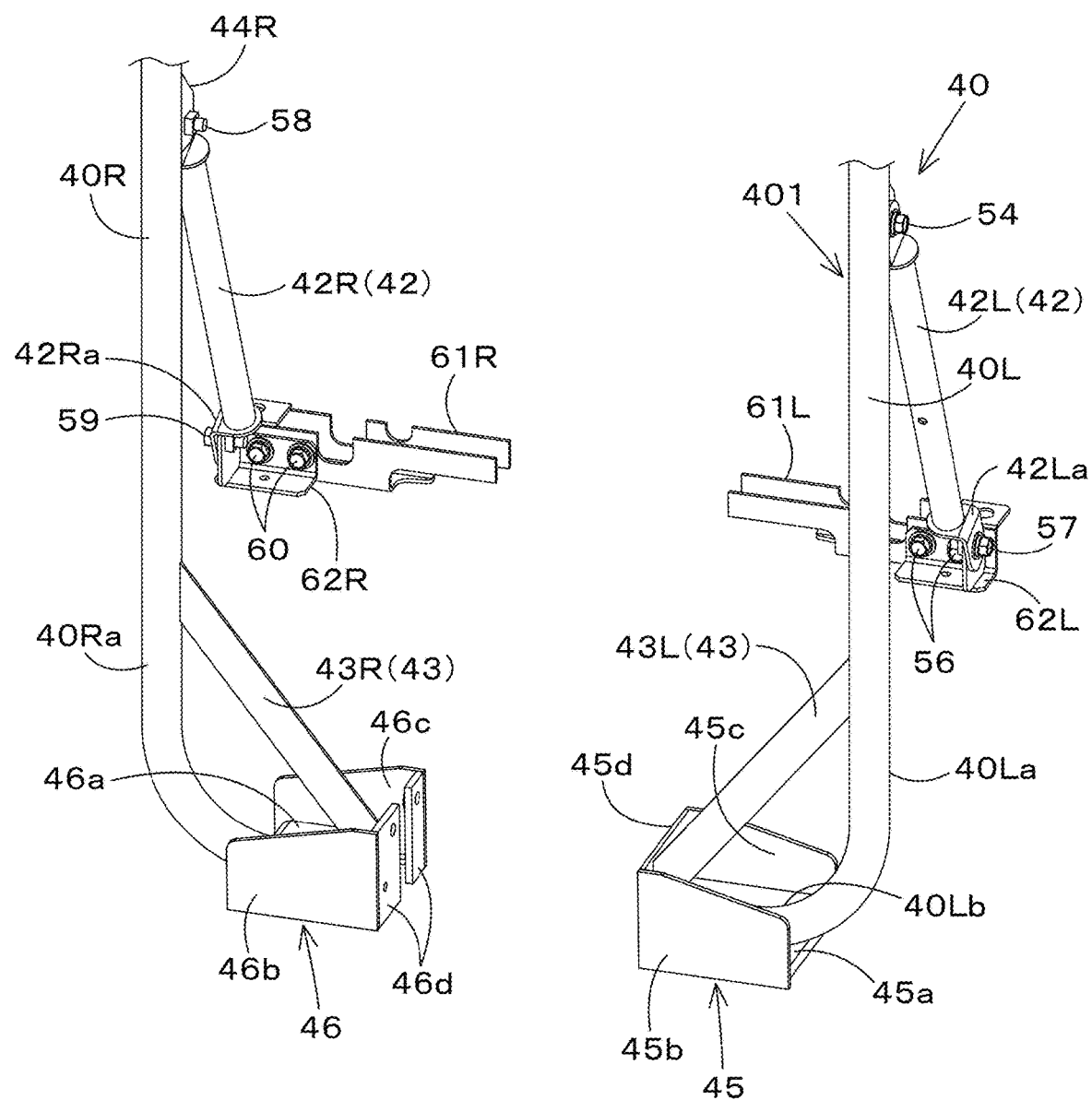
FIG. 10 is a perspective view of the lower portion of the support body.
Figure 11:
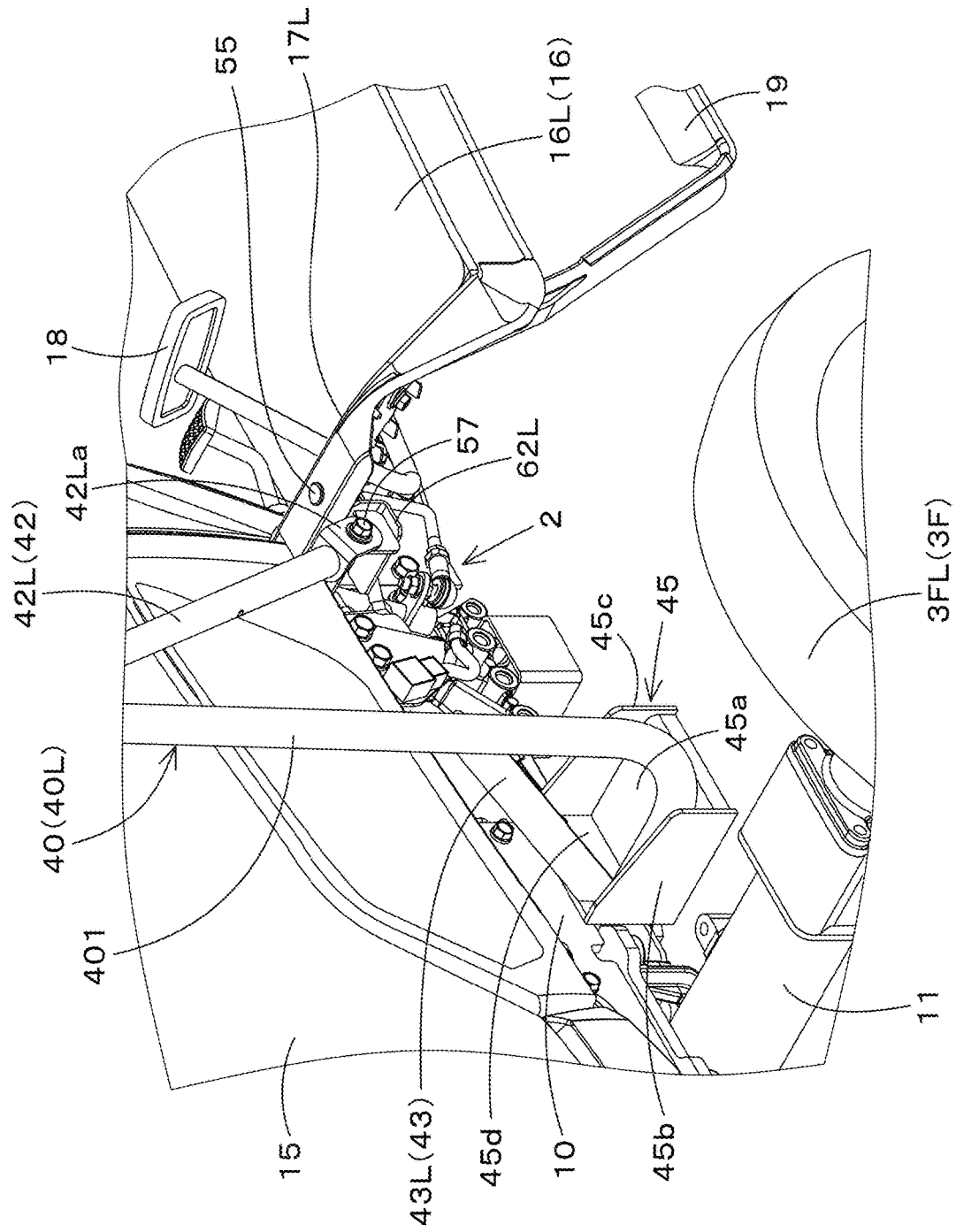

As illustrated in FIGS. 6, 8, and 10, a connection piece 42Ra is provided on the other end of the second main reinforcement 42R. The connection piece 42Ra is joined to the second connection member 62R with a fastener (a bolt and a nut) 59. The configuration of the second connection member 62R is similar to the configuration of the first connection member 62L. Specifically, the shape of the second connection member 62R and the shape of the first connection member 62L are symmetric with respect to the center of the vehicle body 2 in the vehicle-width direction. The second connection member 62R is joined to the second joint member 61R with a fastener (a bolt and a nut) 60. Accordingly, the second main reinforcement 42R and the second joint member 61R are joined to each other through the second connection member 62R. Further, the second main reinforcement 42R is joined to the second rising portion 17R of the second step 16R through the second joint member 61R.

As described above, the first main reinforcement 42L that reinforces the first strut 40L is joined to the first step 16L through the first joint member 61L. Further, the second main reinforcement 42R that reinforces the second strut 40R is joined to the second step 16R through the second joint member 61R. Thus, the first strut 40L and the second strut 40R can be supported and reinforced by the first main reinforcement 42L and the second main reinforcement 42R from behind (obliquely below and behind). Accordingly, it is possible to increase the strength (stiffness) of the support body 40 against forces applied thereto from front.

The first main reinforcement 42L and the second main reinforcement 42R may extend forward (specifically, obliquely downward and forward) from the vertically intermediate portions of the respective struts 40L and 40R to the vehicle body 2. In this case, the first main reinforcement 42L and the second main reinforcement 42R support and reinforce the first strut 40L and the second strut 40R from front (obliquely below and front). Thus, it is possible to increase the strength (stiffness) of the support body 40 against forces applied thereto from behind.

As illustrated in FIGS. 3 and 4, the sub reinforcements 43 extend inward in the vehicle-width direction from vertically intermediate portions (specifically, vertically intermediate portions of the lower section 401) of the respective struts (the first strut 40L and the second strut 40L) to the vehicle body 2. The first sub reinforcement 43L connects the vertically intermediate portion of the first strut 40L to the vehicle body 2. The second sub reinforcement 43R connects the vertically intermediate portion of the second strut 40R to the vehicle body 2.

As illustrated in FIG. 8 and the like, the main reinforcements 42 and the sub reinforcements 43 are joined to the respective struts 40L and 40R so that positions where the main reinforcements 42 are joined to the struts 40L and 40R are offset upward or downward from positions where the sub reinforcements 43 are joined to the struts 40L and 40R. Specifically, the positions where the main reinforcements 42 are joined to the struts 40L and 40R are above the positions where the sub reinforcements 43 are joined to the struts 40L and 40R.

As illustrated in FIG. 9, the first sub reinforcement 43L is joined at one end (upper end) thereof to the first vertical portion 40La and joined at the other end (lower end) thereof to the first traversal portion 40Lb and the first bracket 45 (first side plate 45d). The second sub reinforcement 43R is joined at one end (upper end) thereof to the second vertical portion 40Ra and joined at the other end (lower end) thereof to the second traversal portion 40Rb and the second bracket 46 (second side plate 46d).

The first sub reinforcement 43L can reinforce the first strut 40L in the vehicle-width direction, which is different from the reinforcing direction of the first main reinforcement 42L. Further, the second sub reinforcement 43R can reinforce the second strut 40R in the vehicle-width direction, which is different from the reinforcing direction of the second main reinforcement 42R. Accordingly, the first strut 40L and the second strut 40R are reinforced in both the fore-and-aft direction and the vehicle-width direction, which largely improves the strength (stiffness) of the support body 40.

Although the support body 40 preferably includes both the main reinforcement 42 and the sub reinforcement 43 as the reinforcements, the support body 40 may include at least one of the main reinforcement 42 and the sub reinforcement 43. When the support body 40 includes the main reinforcement 42, the support body 40 preferably includes both the first main reinforcement 42L and the second main reinforcement 42R. However, the support body 40 may include at least one of the first main reinforcement 42L and the second main reinforcement 42R. When the support body 40 includes the sub reinforcement 43, the support body 40 preferably includes both the first sub reinforcement 43L and the second sub reinforcement 43R. However, the support body 40 may include at least one of the first sub reinforcement 43L and the second sub reinforcement 43R.

The riding management machine 1 according to the above preferred embodiment provides the following effects.

The riding management machine 1 includes the traveling vehicle 1A including the vehicle body 2, the operator's seat 4 on the vehicle body 2, and the hood 15 in front of the operator's seat 4, the working device 1B attached to the traveling vehicle 1A, the position detector 30 to detect the position of the vehicle body 2 based on a signal from the positioning satellite, and the support body 40 to support the position detector 30 above the hood 15. The support body 40 includes the pair of struts 40 L and 40R on opposite sides of the vehicle body 2 in the vehicle-width direction, the connector 40C to connect the tops of the pair of struts 40L and 40R to each other, and the reinforcements 42 and 43 to connect the respective struts 40L and 40R to the vehicle body 2.

This configuration includes the support body 40 having a structure including the struts 40L and 40R reinforced by the reinforcements 42 and 43. Thus, the support body 40 can reliably support the position detector 30 on the vehicle body 2. Further, a signal from the positioning satellite is less likely to be blocked by supporting the position detector 30 above the hood 15. Thus, the receiving sensitivity of the position detector 30 can be improved.

The reinforcements include the main reinforcements 42 extending forward or rearward from the vertically intermediate portions of the respective struts 40L and 40R to the vehicle body 2, and the sub reinforcements 43 extending in the vehicle-width direction from the vertically intermediate portions of the respective struts 40L and 40R to the vehicle body 2.

According to this configuration, the main reinforcements 42 can improve the strength of the support body 40 against forces in the fore-and-aft direction, and the sub reinforcements 43 can improve the strength of the support body 40 against forces in the vehicle-width direction. Thus, the support body 40 can stably and reliably support the position detector 30.

The main reinforcements 42 and the sub reinforcements 43 are joined to the respective struts 40L and 40R so that positions where the main reinforcements 42 are joined to the struts 40L and 40R are offset upward or downward from positions where the sub reinforcements 43 are joined to the struts 40L and 40R.

According to this configuration, the struts 40L and 40R are supported and reinforced at a plurality of positions in the vertical direction. Thus, it is possible to prevent stress concentration in a portion of the support body 40, which enables effective reinforcement of the support body 40.

The positions where the main reinforcements 42 are joined to the struts 40L and 40R are above the positions where the sub reinforcements 43 are joined to the struts 40L and 40R.

According to this configuration, it is possible to effectively reinforce the strength of the support body 40 against forces in the fore-and-aft direction in which the support body 40 is more prone to falling-down than in the vehicle-width direction by using the main reinforcements 42 while reinforcing the strength of the support body 40 against forces in the vehicle-width direction by using the sub reinforcements 43.

The struts 40L and 40R include the first strut 40L provided on the one side in the vehicle-width direction of the vehicle body 2, and the second strut 40R provided on the other side in the vehicle-width direction of the vehicle body 2. The reinforcements include the first reinforcements 42L and 43L connecting the vertically intermediate portion of the first strut 40L to the vehicle body 2, and the second reinforcements 42R and 43R connecting the vertically intermediate portion of the second strut 40R to the vehicle body 2.

According to this configuration, the struts 40L and 40R can be reinforced by the reinforcements 42 and 43 on both the one side and the other side in the vehicle-width direction of the vehicle body 2. Thus, the strength of the support body 40 is improved.

The riding management machine 1 includes the traveling device 3 including the front wheels 3F and the rear wheels 3R to movably support the vehicle body 2, the front axle frame 10 to support the front axle 12 joined to the front wheels 3F, and the brackets 45 and 46 each of which is attached to the front axle frame 10 to have the lower portion of each of the struts 40L and 40R fixed thereto.

According to this configuration, the lower portions of the struts 40L and 40R are attached to the front axle frame 10 through the brackets 45 and 46. Thus, the lower portions of the struts 40L and 40R can be reliably and stably attached to the vehicle body 2.

Each of the sub reinforcements 43 is fixed at the lower end thereof to each of the brackets 45 and 46.

According to this configuration, the lower ends of the sub reinforcements 43 are attached to the front axle frame 10 through the brackets 45 and 46. Thus, the struts 40L and 40R can be reliably reinforced by the stable sub reinforcements 43.

The strut 40L includes, at the lower end thereof, the traversal portion 40Lb extended inward in the vehicle-width direction and fixed to the bracket 45. The strut 40R includes, at the lower end thereof, the traversal portion 40Rb extended inward in the vehicle-width direction and fixed to the bracket 46.

According to this configuration, it is possible to ensure a long abutting length between the lower end of the strut 40L and the bracket 45 and between the lower end of the strut 40R and the bracket 46. Thus, the lower ends of the struts 40L and 40R can be respectively fixed to the brackets 45 and 46 with high strength.

Each of the sub reinforcements 43 is fixed at the lower end thereof to each of the traversal portions 40Lb and 40Rb.

According to this configuration, the sub reinforcements 43 connect the vertically intermediate portions of the struts 40L and 40R to the traversal portions 40Lb and 40Rb. Thus, the stiffness of the struts 40L and 40R can be improved.

The riding management machine 1 includes the steps 16 provided forward and sideward of the operator's seat 4. Each of the main reinforcements 42 is joined at one end thereof to each of the struts 40L and 40R and is joined at the other end thereof to each of the steps 16.

According to this configuration, the struts 40L and 40R are connected to the steps 16 through the main reinforcements 42. Thus, the steps 16 having high stiffness can receive forces applied to the struts 40L and 40R from the front. Accordingly, the strength (stiffness) of the struts 40L and 40R against forces from front can be largely improved.

The support body 40 includes the lower section 401 attached to the vehicle body 2, and the upper section 402 detachably attached to the lower section 401. The lower section 401 includes the lower portion of the first strut 40L and the lower portion of the second strut 40R. The upper section 402 includes the connection portion 40C, the upper portion of the first strut 40L, and the upper portion of the second strut 40R.

According to this configuration, the support body 40 can be separated into the upper section 402 and the lower section 401. Thus, the support body 40 can be easily attached to and detached from the vehicle body 2.

The reinforcements 42 and 43 connect the lower section 402 to the vehicle body 2.

According to this configuration, the reinforcements 42 and 43 support the lower section 402 of the struts 40L and 40R. Thus, the reinforcements 42 and 43 can more effectively reinforce portions close to bases of the struts 40L and 40R.

The first strut 40L, the second strut 40R and the connection portion 40C each include a round pipe.

According to this configuration, the round pipes can achieve the support body 40 having light weight and high strength.

In the above description, preferred embodiments of the present invention have been explained. However, all the features of the preferred embodiments disclosed in this application should be considered just as examples, and the preferred embodiments do not restrict the present invention accordingly. A scope of the present invention is illustrated not in the above-described preferred embodiments but in claims, and is intended to include all modifications within and equivalent to a scope of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A riding management machine, comprising:
   a traveling vehicle including:
      a vehicle body;
      an operator's seat provided on the vehicle body; and
      a hood provided in front of the operator's seat;
   a working device attached to the traveling vehicle;
   a position detector to detect a position of the vehicle body based on a signal from a positioning satellite; and
   a support body to support the position detector above the hood; wherein
   the support body includes:
      a pair of struts on opposite sides of the vehicle body in a vehicle-width direction;
      a connector to connect tops of the pair of struts to each other; and
      reinforcements to connect the respective struts to the vehicle body; and the reinforcements include:
: main reinforcements extending forward or rearward from vertically intermediate portions of the respective struts to the vehicle body; and
: sub reinforcements extending in the vehicle-width direction from the vertically intermediate portions of the respective struts to the vehicle body.

2. The riding management machine according to claim 1, wherein the main reinforcements and the sub reinforcements are joined to the respective struts so that positions where the main reinforcements are joined to the struts are offset upward or downward from positions where the sub reinforcements are joined to the struts.

3. The riding management machine according to claim 2, wherein the positions where the main reinforcements are joined to the struts are above the positions where the sub reinforcements are joined to the struts.

4. The riding management machine according to claim 1, further comprising:
: steps provided forward and sideward of the operator's seat; and
: each of the main reinforcements is joined at one end thereof to each of the struts and is joined at the other end thereof to each of the steps.

5. A riding management machine, comprising:
: a traveling vehicle including:
:: a vehicle body:
:: an operator's seat provided on the vehicle body; and
:: a hood provided in front of the operator's seat;
: a working device attached to the traveling vehicle;
: a position detector to detect a position of the vehicle body based on a signal from a positioning satellite; and
: a support body to support the position detector above the hood; wherein
: the support body includes:
:: a pair of struts on opposite sides of the vehicle body in a vehicle-width direction;
:: a connector to connect tops of the pair of struts to each other; and
:: reinforcements to connect the respective struts to the vehicle body;
: the struts include:
:: a first strut on a first side of the vehicle body in the vehicle-width direction; and
:: a second strut on a second side of the vehicle body in the vehicle-width direction; and
: the reinforcements include:
:: a first reinforcement to connect a vertically intermediate portion of the first strut to the vehicle body; and
:: a second reinforcement to connect a vertically intermediate portion of the second strut to the vehicle body.

6. The riding management machine according to claim 5, wherein the support body includes:
: a lower section attached to the vehicle body; and
: an upper section detachably attached to the lower section;
: the lower section includes a lower portion of the first strut and a lower portion of the second strut; and
: the upper section includes the connector, an upper portion of the first strut, and an upper portion of the second strut.

7. The riding management machine according to claim 6, wherein the reinforcements connect the lower section to the vehicle body.

8. The riding management machine according to claim 5, wherein each of the first strut, the second strut and the connector include a round pipe.

9. A riding management machine, comprising:
: a traveling vehicle including:
:: a vehicle body:
:: an operator's seat provided on the vehicle body; and
:: a hood provided in front of the operator's seat;
: a working device attached to the traveling vehicle;
: a position detector to detect a position of the vehicle body based on a signal from a positioning satellite;
: a support body to support the position detector above the hood, the support body including:
:: a pair of struts on opposite sides of the vehicle body in a vehicle-width direction;
:: a connector to connect tops of the pair of struts to each other; and
:: reinforcements to connect the respective struts to the vehicle body;
: a traveling device including front wheels and rear wheels to movably support the vehicle body;
: a front axle frame to support a front axle joined to the front wheels; and
: brackets each of which is attached to the front axle frame and fixable to a lower portion of each of the struts.

10. The riding management machine according to claim 9, wherein
: the reinforcements include:
:: main reinforcements extending forward or rearward from vertically intermediate portions of the respective struts to the vehicle body; and
:: sub reinforcements extending in the vehicle-width direction from the vertically intermediate portions of the respective struts to the vehicle body; and
: each of the sub reinforcements is fixed at a lower end thereof to each of the brackets.

11. The riding management machine according to claim 10, wherein each of the struts includes, at a lower end thereof, a traversal portion extending inward in the vehicle-width direction and fixed to each of the brackets.

12. The riding management machine according to claim 11, wherein each of the sub reinforcements is fixed at a lower end thereof to each of the traversal portions.

\* \* \* \* \*

UNITED STATES PATENT AND TRADEMARK OFFICE
CERTIFICATE OF CORRECTION

| | | |
|---|---|---|
| PATENT NO. | : 12,077,103 B2 | Page 1 of 1 |
| APPLICATION NO. | : 17/552482 | |
| DATED | : September 3, 2024 | |
| INVENTOR(S) | : Misako Kikumoto et al. | |

It is certified that error appears in the above-identified patent and that said Letters Patent is hereby corrected as shown below:

On the Title Page

The following should be added to the FOREIGN PATENT DOCUMENTS of the References Cited of item (56) on the second page:
--JP 2019080498 A 5/2019--

The following should be added to the OTHER PUBLICATIONS of the References Cited item (56) on the second page:
--Official Communication issued in corresponding Chinese Patent Application No. 202080041765.3, mailed on June 21, 2024, 46 pages.--

Signed and Sealed this
Sixth Day of May, 2025

Coke Morgan Stewart
*Acting Director of the United States Patent and Trademark Office*